United States Patent [19]

Boeck et al.

[11] 3,995,919
[45] Dec. 7, 1976

[54] ANTIFRICTION BEARING

[75] Inventors: Walter Boeck, Schweinfurt; Alfred Köelle, Gochsheim, both of Germany

[73] Assignee: SKF Industrial Trading and Development Company, B.V., Nieuwegein, Netherlands

[22] Filed: July 3, 1975

[21] Appl. No.: 593,175

[30] Foreign Application Priority Data

July 26, 1974 Germany .......................... 2435965

[52] U.S. Cl. ............................................... 308/198
[51] Int. Cl.² ........................................ F16C 13/00
[58] Field of Search ............... 308/189 R, 195, 198

[56] References Cited

UNITED STATES PATENTS

| 1,970,699 | 8/1934 | Herrmann | 308/198 |
| 3,148,922 | 9/1964 | Roessler, Jr. | 308/198 |

Primary Examiner—M. H. Wood, Jr.
Assistant Examiner—Richard A. Bertsch
Attorney, Agent, or Firm—Daniel M. Rosen

[57] ABSTRACT

A loading aperture is provided in the circumference of the race of a rolling bearing for the insertion of rolling members into the race, and an expandable closure is provided for closing the aperture. The closure may have a slot into which a member, such as a ball or wedge, is inserted, for expanding the closure.

10 Claims, 8 Drawing Figures

ANTIFRICTION BEARING

THE INVENTION

The present invention relates to a rolling bearing, and is particularly directed to roller bearings including an aperture for the insertion of the rolling members in the bearing, whereby the aperture may be closed by a closure or the like.

Antifriction bearings such as rolling bearings having collars or shoulders on both bearing rings have been provided with an aperture or recess of the size of one rolling element or member in either the inner or in the outer ring of such bearing. The rolling elements or members are inserted into the bearing interior through these apertures, and are distributed therein. Normally, such a loading aperture remains open. This structure, however, has the disadvantage that the rolling elements constantly roll by the loading aperture, and failure of the bearing may result, especially if axial forces press the rolling members against the collar or shoulder in which such aperture is located.

In order to avoid this disadvantage, the loading apertures may be closed after the rolling elements have been inserted. For this purpose, separately manufactured closures are inserted into the loading apertures and are fastened therein by means of screws, pins, etc. to the bearing ring. Such known embodiments have the disadvantage that due to relatively small dimensions of the bearings, there may be insufficient space for the bores of fasteners. The bores in the closures and those in the bearing ring must match. This cannot be achieved without some difficulty. In addition, the fastening of such closure in such arrangements normally tends to be rather time-consuming.

The object of the present invention is to provide a rolling bearing of the above described type wherein said closures can be mounted without considerable expenditure, and in a minimum of time. In order to achieve this object, in accordance with the invention, a rolling bearing is provided wherein the closure is expandable within the loading aperture. The expansion of the closure is effected, in accordance with another feature of the invention, by the provision of expanding means which can be driven or pressed into openings such as slots and/or bores in the closure or locking piece. For example, a suitable expanding means may be comprised of a ball or a wedge adapted to be forced into an opening of the closure.

In one preferred embodiment of the invention, the closure or locking piece is provided with an opening, for example, a slot, etc., only on one face, the slot extending only a part of the height of the closure.

In the preferred process for the production of such antifriction bearings the closure is inserted so that the slot is positioned towards the interior of the bearing. In this case, during mounting, the expansion element, i.e., the ball as an example, is inserted between the plane base surface of the loading aperture and the side of the slotted closure or locking piece, and the element is then pressed, by axial force acting onto the closure, into said slot. The closure is thereby expanded by forcing the expansion element into the slot, so that it fully engages the cylindrical surface of the loading aperture and is held tightly therein.

In order that the invention will be more clearly understood, it will now be described in greater detail with reference to the drawings, wherein.

Figure 1:
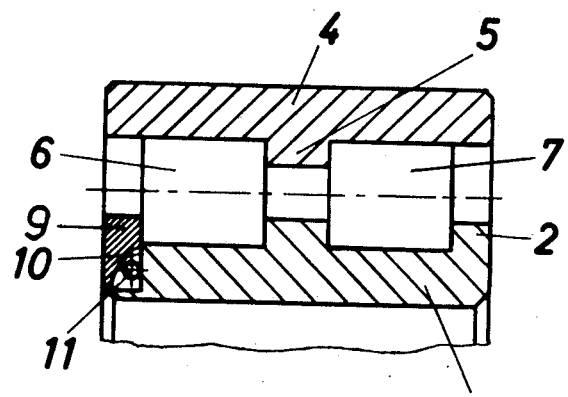
FIG. 1 is a cross-sectional view through a portion of a two-row cylindrical roller bearing and illustrating a closure in accordance with one embodiment of the invention.
Figure 2:
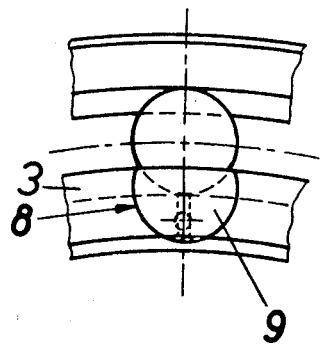
FIG. 2 is a lateral view of the portion of the two-row cylindrical roller bearing of FIG. 1.
Figure 3:
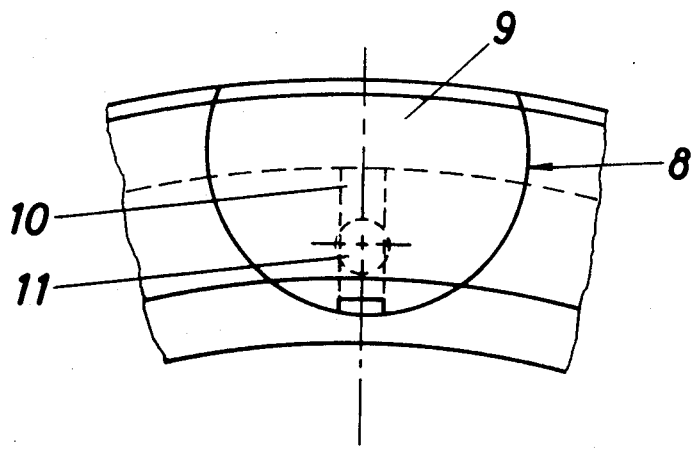
FIG. 3 is a view of a portion of FIG. 2 on an enlarged scale.

Referring now to the drawings, FIGS. 1 and 2 illustrate a portion of a rolling bearing having an annular inner race 1. Both ends of the inner race 1 have radially outwardly extending lateral collars or shoulders 2, 3 forming one piece with said inner race. An outer annular race 4 has a median radially inwardly extending ridge 5 forming one piece with the race 4. Cylindrical rollers 6, 7 are arranged in two rows between said two bearing races in conventional manner. Only a portion of the races has been shown, to simplify the illustrations, and it is apparent that the spaces between the races is filled with rollers in the conventional manner.

Figure 4:
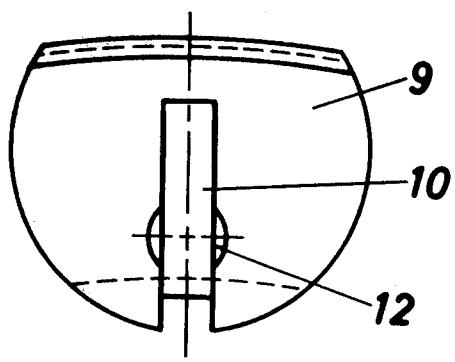
FIG. 4 is a lateral view of the closure or locking piece of the bearing of FIGS. 1–3 on an enlarged scale.
Figure 5:
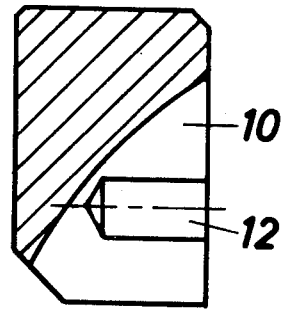
FIG. 5 is a cross-sectional view through the center of the closure or locking piece of FIG. 4.

A loading orifice 8 is provided in the shoulder 3 of the inner race 1, at one position on its circumference. The aperture 8 is closed by a closure or locking piece 9, which can be more clearly seen in FIGS. 4 and 5. The closure 9, as shown in FIGS. 4 and 5 has a recess or slot 10 in its face portion into which a ball 11 is forced or pressed. The slot preferably is in a plane that extends axially of the bearing. The diameter of the ball 11 is preferably greater than the width of the slot 10. Thus, when forcing the ball into the slot 10, the material of the closure or locking piece is expanded to fully engage the wall of the loading aperture 8. In order to enable more accurate positioning of the ball 11 in the slot, a bore 12 with a slightly lesser diameter than that of the ball may be provided in the closure 9, the axis of the bore extending preferably in the central plane of the slot and parallel to the axis of the bearing, as illustrated.

In the illustrated embodiment of the invention, the loading aperture each constitutes a segment of a bore, the upper portion of which extends through the shoulder 3 and the lower portion of which is aligned with the base portion of the inner race 1. The aperture 8 thus intersects the outer circumference of the shoulder 3. The closure 9 is of the same shape as the aperture 8, whereby the closure 9 substantially completely fills the bore. The bore 12 in the closure is aligned with the base portion of the race 1, so that the ball or wedge 11, aligned at the end of the bore 12, is forced into a slot 10 and bore 12 as the closure 9 is forced into loading aperture 8. The closure 9 is thus expanded as it is driven into position, and it is consequently firmly held in the loading aperture 8.

Figure 6:
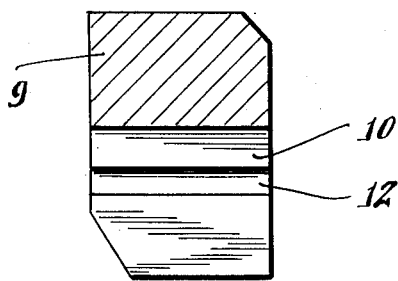
FIG. 6 is a cross-sectional view through the center of a closure, in accordance with one modification of the arrangement of FIG. 5.
Figure 7:
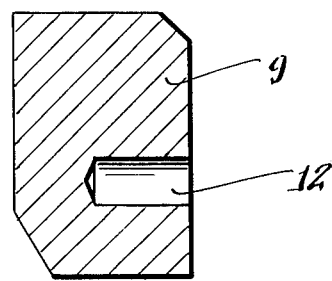
FIG. 7 is a cross-sectional view through the center of a closure in accordance with a further modification of the invention.
Figure 8:
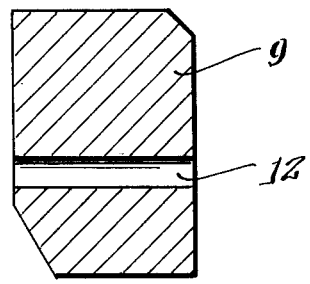
FIG. 8 is a cross-sectional view through the center of a closure in accordance with a still further embodiment of the invention.

Alternatively, the slot may extend across the entire width of the closure, as shown in FIG. 6. As a still further alternative, the slot may be provided only on that face of the closure which is directed axially outwardly of the bearing, so that an expanding means or element, such as a ball or a wedge, can be driven into the slot from outside of the bearing after the closure has been installed. As a still further alternative, the slot may be replaced with a bore extending partly or completely through the closure into which the expanding element is driven as illustrated in FIGS. 7 and 8, respectively. The closure may be of the same material as the bearing race, however, it is also possible to employ any other suitable material thereof, for example, a plastic.

It will, of course, be understood that the invention is not limited to the embodiments described herein, there being further alternatives within the scope of the idea of the invention available in the form of design variations. Thus, for example, a separate loading aperture can be provided in each of the bearing races, with each of the apertures having a closure of its own.

What is claimed is:

1. In a rolling bearing of the type having first and second opposed races, rolling members positioned to roll between said races, a shoulder extending from at least one of said races to inhibit removal of said rolling members from between said races, a loading aperture extending through said shoulder to permit the loading of rolling members into said bearing, a closure member, said loading aperture also extending partially into said race adjacent said shoulder to form a seat for said closure member, said closure member being fitted in said loading aperture to inhibit removal of said rolling members by way of said aperture, and means for holding said closure member in said aperture and against said seat, the improvement wherein said closure member is expandable and has a recess facing said seat, and said holding means comprises an element engaging said seat and extending into said recess for expanding the material of said closure member outwardly against the walls of said aperture.

2. The rolling bearing of claim 1, wherein said recess extends only through the face of said closure member toward the respective race of said bearing.

3. The rolling bearing of claim 2, wherein said recess comprises a slot extending axially of said bearing.

4. The rolling bearing of claim 3, wherein said element comprises a ball.

5. The rolling bearing of claim 4, further comprising a bore in center of slot and extending axially of said bearing, said ball being positioned in said bore.

6. The rolling bearing of claim 2, wherein said element comprises a ball having a diameter slightly greater than the width of said recess.

7. The rolling bearing of claim 2, wherein said recess comprises a bore, and said expanding means comprises a ball having a diameter slightly greater than the diameter of said bore.

8. The rolling bearing of claim 2 wherein the walls of said aperture extend only axially of said bearing.

9. The rolling bearing of claim 2, wherein said closure member is of a material different than that of said bearing race.

10. The rolling bearing of claim 9, wherein said closure member is of a plastic material.

* * * * *